UNITED STATES PATENT OFFICE.

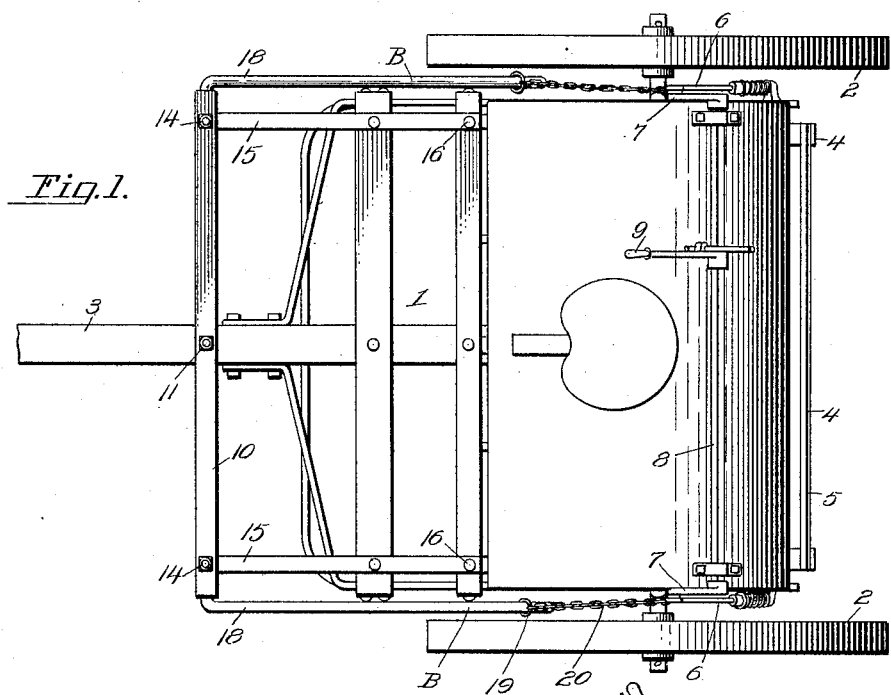
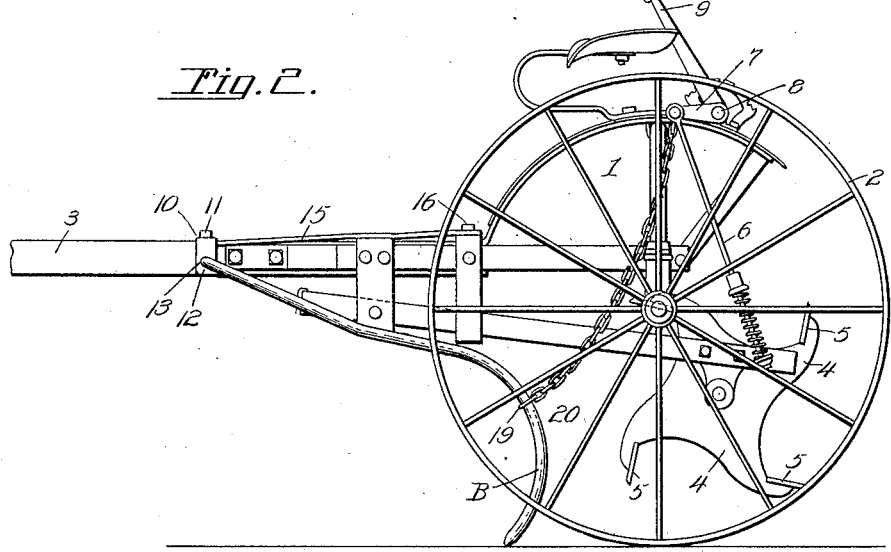

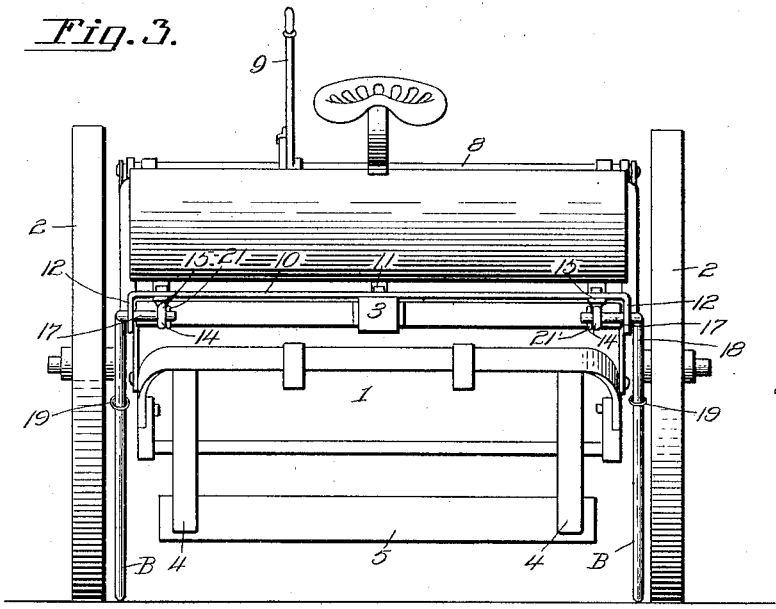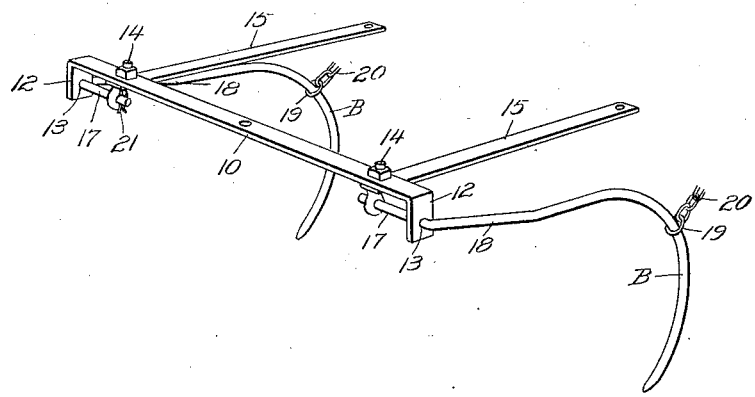

PHILIP J. GRAUL, OF MASCOUTAH, ILLINOIS.

STALK-CUTTER.

1,055,901.

Specification of Letters Patent.

Patented Mar. 11, 1913.

Application filed October 22, 1912. Serial No. 727,227.

*To all whom it may concern:*

Be it known that I, PHILIP J. GRAUL, a citizen of the United States, residing at Mascoutah, in the county of St. Clair and State of Illinois, have invented new and useful Improvements in Stalk-Cutters, of which the following is a specification.

This invention relates to stalk cutters such as are used for chopping or cutting corn stalks and cotton stalks into short lengths, enabling them to be subsequently plowed under for the purpose of enriching the soil.

In most stalk cutters the knives or cutting members are arranged to operate transversely with respect to the line of progress. When the stalks fall longitudinally with respect to the line of progress they will be satisfactorily engaged by the cutting members. It frequently, however, happens that corn and cotton stalks have been beaten down by the weather or other causes in such a manner as to lie transversely of the line of progress. When this is the case it is obvious that such stalks will either not be engaged or only imperfectly engaged by the cutting members, and it is also found that they are liable to become entangled with the cutting apparatus and other parts of the machine.

The present invention has for its object to produce a simple and efficient attachment which may be readily and quickly applied to an ordinary stalk cutter and by the use of which stalks lying otherwise than longitudinally with respect to the line of progress will be dragged into proper position to be engaged by the cutting apparatus.

A further object of the invention is to produce a device or attachment of the character described including drag hooks which may be lifted to a non-operating position with respect to the ground when the cutting apparatus is thrown out of operation.

With these and other ends in view which will readily appear as the nature of the invention is better understood, the same consists in the improved construction and novel arrangement and combination of parts which will be hereinafter fully described and particularly pointed out in the claims.
In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a stalk cutter of conventional construction to which the invention has been applied. Fig. 2 is a side elevation of the same. Fig. 3 is a front elevation. Fig. 4 is a perspective view showing the improved device detached.

Corresponding parts in the several figures are denoted by like characters of reference.

A stalk cutter of conventional form has been shown, the same including a frame 1 mounted on ground wheels 2 and having a draft tongue 3. A cutting member or drum 4 which is suitably supported for rotation is equipped with knives or cutters 5, and said drum may be vertically adjusted by means of links 6 connected with arms 7 radiating from a rock shaft 8 which may be rocked by means of a lever 9 for the purpose of lowering or raising the cutting drum into or out of engagement with the ground.

The improved attachment comprises a cross bar 10 supported on the tongue 3 in advance of the frame and connected detachably with the tongue by means of a pin or bolt 11. The cross bar 10 is terminally bent to form lugs or ears 12 having apertures 13. Secured on the underside of the cross bar 10 by means of eye bolts 14, closely adjacent to the downturned lugs 12, are rearwardly extending straps or braces 15, the rear ends of which are secured on the frame 1 by fastening members, such as bolts 16. The apertured lugs 12 and the eye bolts 14 at the ends of the cross bar 10 combine to form bearings for journals or pintles 17 formed at the forward ends of the shanks 18 of the drag hooks B. These drag hooks, one of which is arranged at either side of the machine, are supported adjacent to the inner faces of the ground wheels and suitably spaced from the latter so as to leave ample clearance for the successful operation of the device. These drag hooks which may be formed from rods of iron or steel by suitably bending the same are provided with links 19 which are suitably connected therewith a short distance above the earth engaging points or bills of said hooks, said links being connected by flexible elements, such as chains 20, with the arms 7 of the rock shaft 8. The journals 17 of the hooks may be provided with keys or cotter pins 21 to retain them in their respective bearings.

It will be seen that in the operation of a stalk cutter equipped with the improved device, the drag hooks B will engage stalks lying crosswise of the machine and will drag the same to a lengthwise position in front of the cutting apparatus, whereby such stalks will then be engaged and chopped into lengths of proper dimensions. When the machine is to be transported from place to place, and the cutting drum is lifted to a non-engaging position with respect to the ground the drag hooks will simultaneously be lifted to a non-engaging position by the chains 20 connecting said hooks with the arms of the rock shaft 8. The braces 15 will support the cross bar 10 securely in the desired position in advance of the frame to enable the drag hooks to be mounted in the most advantageous position for operation.

The construction of the improved attachment is simple and inexpensive, and said attachment when not in use may be readily disassembled and folded into small compass.

Having thus described the invention, what is claimed as new, is:—

1. An attachment for stalk cutters comprising a bar having downturned apertured ends, braces extending rearwardly from the bar, eye bolts connecting the braces with the bar, and drag hooks having journals engaging the apertured ends of the bar and the eye bolts adjacent thereto.

2. An attachment for stalk cutters comprising a bar provided at the ends thereof with apertured lugs, eye bolts adjacent to said lugs, braces connected with and extending rearwardly from the eye bolts, drag hooks having shanks provided at the front ends thereof with journals engaging the apertured lugs and the eye bolts, means for retaining the journals in engaging position, and links connected with the drag hooks.

In testimony whereof I affix my signature in presence of two witnesses.

PHILIP J. GRAUL.

Witnesses:
 PETER W. LILL,
 JACOB OHL.

Copies of this patent may be obtained for five cents each, by addressing the "Commissioner of Patents, Washington, D. C."